US006584958B2

(12) United States Patent
Rahardja et al.

(10) Patent No.: US 6,584,958 B2
(45) Date of Patent: Jul. 1, 2003

(54) DIRECTLY ACTUATED INJECTION VALVE WITH A FERROMAGNETIC NEEDLE

(75) Inventors: Irawan Rahardja, Vancouver (CA); Mike Hebbes, Vancouver (CA)

(73) Assignee: Westport Research Inc., Vancouver (CA)

( * ) Notice: Subject to any disclaimer, the term of this patent is extended or adjusted under 35 U.S.C. 154(b) by 70 days.

(21) Appl. No.: 09/863,188

(22) Filed: May 23, 2001

(65) Prior Publication Data

US 2001/0035163 A1 Nov. 1, 2001

Related U.S. Application Data

(63) Continuation-in-part of application No. 09/522,130, filed on Mar. 9, 2000, now Pat. No. 6,298,829.
(60) Provisional application No. 60/159,791, filed on Oct. 15, 1999.

(51) Int. Cl.[7] .......................... F02M 41/00; F02M 37/04
(52) U.S. Cl. ...................................... 123/467; 123/498
(58) Field of Search .............................. 123/467, 472, 123/478, 498; 251/129.06; 239/533.2, 533.9, 102.2

(56) References Cited

U.S. PATENT DOCUMENTS

| 3,598,506 | A | * | 8/1971 | O'Neill ...................... 417/383 |
| 4,158,368 | A | | 6/1979 | Clark ....................... 137/487.5 |
| 4,553,059 | A | * | 11/1985 | Abe et al. .................... 310/328 |
| 4,725,002 | A | * | 2/1988 | Trachte .................... 239/102.2 |
| 4,813,601 | A | | 3/1989 | Schwerdt et al. ............. 239/91 |
| 4,909,440 | A | * | 3/1990 | Mitsuyasu et al. ............ 239/96 |
| 4,995,587 | A | * | 2/1991 | Alexius .................. 251/129.06 |
| 5,031,841 | A | | 7/1991 | Schafer ....................... 239/585 |
| 5,035,360 | A | | 7/1991 | Green et al. ................. 239/585 |
| 5,697,554 | A | | 12/1997 | Auwaerter et al. ........... 239/88 |
| 5,779,149 | A | | 7/1998 | Hayes, Jr. .................... 239/124 |
| 5,819,710 | A | | 10/1998 | Huber ........................ 123/498 |
| 5,845,852 | A | | 12/1998 | Waldman et al. ........ 239/533.8 |
| 5,875,764 | A | * | 3/1999 | Kappel et al. ............... 123/467 |
| 6,062,533 | A | | 5/2000 | Kappel et al. ................. 251/57 |

FOREIGN PATENT DOCUMENTS

| DE | 197 27 992 | 1/1999 |
| EP | 0 869 278 | 10/1998 |
| GB | 2 321 501 | 7/1998 |
| JP | 09-324723 | 12/1997 |
| JP | 10-009084 | 1/1998 |
| WO | WO 85/02445 | 6/1985 |

\* cited by examiner

*Primary Examiner*—Mahmoud Gimie
(74) *Attorney, Agent, or Firm*—McAndrews, Held & Malloy, Ltd.

(57) ABSTRACT

A directly actuated injection valve comprises a hollow valve housing, a valve needle disposed within the hollow interior, a needle spring and a tubular magnetostrictive actuator assembly disposed in an annular space around a portion of the valve needle. A magnetic field activates the magnetostrictive material to change its length to cause a corresponding movement of the valve needle that actuates the valve. The valve needle is formed from a ferromagnetic material and extends through the tubular magnetostrictive actuator assembly without interfering with the flux field that is directed through the magnetostrictive member. A passive hydraulic link assembly is preferably employed to compensate for component wear, temperature effects and manufacturing variations within design tolerances.

22 Claims, 4 Drawing Sheets

DIRECTLY ACTUATED INJECTION VALVE WITH A FERROMAGNETIC NEEDLE

CROSS-REFERENCE TO RELATED APPLICATION(S)

This application is a continuation-in-part of U.S. patent application Ser. No. 09/522,130 filed Mar. 9, 2000, entitled "Directly Actuated Injection Valve", now U.S. Pat. No. 6,298,829 issued Oct. 9. 2001. The '130 application relates to and claims priority benefits from U.S. Provisional Patent Application Serial No. 60/159,791 filed Oct. 15, 1999, entitled "Directly Actuated Injector". The '130 application and the '791 application are each incorporated herein by reference in their entirety.

FIELD OF THE INVENTION

The present invention relates generally to high-pressure fuel injection valves or injectors for internal combustion engines, and, more specifically, to an injection valve that is directly controllable by a position actuating magnetostrictive material and that includes a passive hydraulic link.

BACKGROUND OF THE INVENTION

Direct injection of a gaseous fuel into the combustion chamber of an internal combustion engine is desirable for several reasons. For example, direct injection allows charge stratification, eliminating throttling losses associated with homogeneous charge engines. Additionally, with direct injection late in the compression stroke, a high-compression ratio can be maintained, maintaining the efficiency of conventional diesel engines. Further, when the fuel that is directly injected comprises natural gas, propane, or hydrogen, the emissions of $NO_x$ and particulate matter (PM) are significantly reduced. The directly injected gaseous fuel can be ignited with a glow plug, with a spark plug, with pilot diesel fuel, or with any other energy source. The gaseous fuel needs to be injected at high pressure to overcome the combustion chamber pressure, which is high at the end of the compression stroke. Preferably, the injection pressure is high enough to promote good mixing between the injected fuel and the combustion chamber air.

Direct injection at high pressures presents several challenges. The use of high pressure fuels for direct injection results in high fuel pressures existing within the injection valve or injector. As a result, when closed, the injection valve should typically be strongly seated to avoid leakage of the fuel into the combustion chamber between injection events. When the valve is a needle valve, the valve is seated when the sealing surfaces of the movable valve needle and the valve seat are in fluid-tight contact with each other. The valve seat is generally part of the valve housing or body.

Moreover, compared to low-pressure systems, higher forces are needed to open the injection valve since the valve should be strongly seated to remain sealed when the valve tip is exposed to the high pressures generated in the combustion chamber. High closing forces are also involved since the needle of a fuel injection valve for a high-pressure system should overcome the high forces generated by the exiting pressurized fuel when the needle is in the open position.

Additionally, there is only a small window of time during which the fuel can be injected. For example, at 4500 revolutions per minute (RPM), at full load, all of the fuel is preferably injected in less than 2–3 milliseconds.

Nearly all known direct fuel injection systems in internal combustion engines have been hydraulically-actuated. These systems rely on a hydraulic fluid to provide the force to open a fuel injection valve (or valves, when the engine comprises a plurality of combustion chambers). Accordingly, at typical engine operating speeds, hydraulically actuated fuel injection valves rely on rapid changes in the hydraulic fluid pressure to open and close the injection valve(s). An injection valve is typically opened by increasing the hydraulic fluid pressure and closed by reducing the hydraulic fluid pressure, such that the opening force applied to the injection valve is reduced, causing the valve to close. However, in the context of a gaseous fuel injection valve, hydraulic operation presents several drawbacks, including:

- the need for additional hydraulic hardware such as a hydraulic pump, valves, and a reservoir for the hydraulic fluid;
- the need for a seal to be established between the variable pressure hydraulic fluid and the high pressure gaseous fuel;
- increased bulkiness of the injection valve assembly because of the additional hardware requirements; and
- delayed response of the system caused by time delays of the hydraulic fluid between the electrical valve hardware and the needle that controls gas flow from the injector.

Moreover, the degree of controllability of the movement of the injection valve is low when the motive force is provided by a pressurized fluid rather than by a directly controllable source. In this respect, it is difficult to control lift, resulting in limited lift control capabilities when using a double-spring configuration. Therefore, it is desirable to avoid the use of hydraulics to operate gaseous fuel injectors, particularly for high-speed engines. "Lift" in the context of injection valves is defined herein as the displacement of the valve needle away from its closed/seated position to its open position.

SUMMARY OF THE INVENTION

An injection valve injects fuel into a combustion chamber of an internal combustion engine. The injection valve comprises:

(a) a valve housing comprising:
  a fuel inlet port;
  an interior chamber fluidly connected to the fuel inlet port;
  a nozzle comprising at least one nozzle orifice providing a fluid passage from the interior chamber to the combustion chamber;

(b) a valve needle formed from a ferromagnetic material and disposed within the valve housing wherein the valve needle is movable between a closed position at which a sealing end of the valve needle contacts a valve seat to fluidly seal the interior chamber from the nozzle orifice, and an open position at which the sealing end of the valve needle is spaced apart from the valve seat whereby the interior chamber is fluidly connected with the nozzle orifice;

(c) a needle biasing mechanism associated with the valve needle, the needle biasing mechanism applying a closing force to the valve needle for biasing the valve needle in the closed position; and (d) an actuator assembly associated with the valve needle and disposed in the interior chamber, the actuator assembly comprising a magnetostrictive member actuatable to expand in length and apply an opening force to the valve needle stronger than the closing force, thereby moving the valve needle to the open position.

In a preferred injection valve, the actuator assembly is disposed within the interior chamber in an annular space surrounding at least a portion of the valve needle. The preferred needle biasing mechanism is a spring, most preferably at least one disc spring.

Locating the actuator assembly in an annular space that surrounds a portion of the valve needle is a preferred arrangement because it allows for a compact design. The actuator assembly is typically elongated and has a length that is determined by the desired lift, which in turn determines the length of the magnetostrictive member. When a magnetostrictive actuator is actuated, a magnetic field is applied to the magnetostrictive member to cause it to expand in length. Longer magnetostrictive members are able to expand by greater amounts, resulting in greater lift when used in an injection valve application.

Conventional devices with similar arrangements (that is, a solid member extending through a tubular magnetostrictive member) employ a non-ferromagnetic member to avoid interfering with the magnetic field. In the field of magnetostrictive materials, it is generally believed that employing a ferromagnetic material for the valve needle will cause leakage of magnetic flux, which may in turn compromise performance since all flux is intended to pass through the tubular magnetostrictive member and the flux paths provided by conventional poles and flux tubes. Consistent with such beliefs, conventional devices with similar arrangements have employed non-ferromagnetic materials such as, for example, austenitic stainless steel, titanium and ceramics.

Compared to ferromagnetic materials, there are a number of disadvantages of employing such non-ferromagnetic materials. For example, titanium and ceramics are generally more expensive and more difficult to machine to high tolerances, compared to ferromagnetic materials such as tool steel. In addition, non-ferromagnetic materials such as titanium and austenitic stainless steel generally can not be hardened to match the durability of ferromagnetic materials. Past approaches to solving some of these disadvantages have included coating the non-ferromagnetic material to improve its durability. Another approach is to use multi-part components comprising, for example, a non-ferromagnetic member extending through the sections where a magnetic field is generated and a ferromagnetic material such as tool steel for the needle tip which impacts against the valve seat.

Although the phenomena of the present injection valve with a ferromagnetic needle is not fully understood, it has been found that, contrary to general beliefs in the field of magnetostrictive materials, a ferromagnetic material can be employed for a valve needle that extends through a tubular magnetostrictive member. It is hypothesized that due to the high frequency switching of the magnetic field during the injection period, the eddy current skin depth of the needle shields the needle from the magnetic circuit and thereby prevents the needle from draining flux from the circuit.

The ferromagnetic material for the valve needle is preferably a suitable tool steel. For example, a tool steel such as H type or M type is a preferred material for the valve needle.

The injection valve preferably further comprises a hydraulic link assembly comprising a passive hydraulic link having a hydraulic fluid thickness through which the opening and closing forces are transmitted. The hydraulic fluid acts substantially as a solid with the thickness being substantially constant while the actuator assembly is activated and wherein the thickness of the hydraulic link is adjustable while the actuator is not activated in response to changes in the dimensional relationship between components of the injection valve to maintain a desired valve lift upon activation of the actuator assembly.

In a preferred embodiment, the thickness of the hydraulic link is auto-adjustable in response to changes in the dimensional relationship caused by differential thermal expansion, variations in manufactured dimensions within design tolerances, and/or wear to components of the injection valve. The hydraulic link assembly preferably comprises a sealed hydraulic cylinder, with a piston and hydraulic fluid disposed within the hydraulic cylinder. The piston may be an integral part of the valve needle.

The actuator assembly preferably comprises an electric coil disposed around the magnetostrictive member and a flux tube disposed around the electric coil. In preferred arrangements, the actuator assembly may be disposed within the interior chamber of the injection valve. In a particular preferred embodiment, the actuator assembly is tubular and disposed within an annular space around a cylindrical portion of the valve needle. One end of the tubular actuator assembly may be held in a fixed position in relation to the valve housing by a pole that supports the magnetostrictive member. The pole is attached to the valve housing to prevent movement of the supported end of the magnetostrictive member when the actuator assembly is activated. In one embodiment, the flux tube and/or the pole associated with the valve housing are integral parts of the valve housing and/or the magnetostrictive member. In this arrangement, the valve housing advantageously also acts as the flux tube and obviates the need for a separate component.

In a preferred embodiment, the injection valve comprises an inlet port and nozzle orifices arranged substantially at opposite ends of the injection valve. Fluid passages are provided through or between the actuator and hydraulic link assemblies and the valve housing to allow fuel to flow from the inlet port to the nozzle orifices. The flow of fuel through such fluid passages helps to cool the actuator and hydraulic link assemblies. Such fluid passages may be formed by providing longitudinally-oriented grooves in the surfaces of components of the actuator assembly and the hydraulic cylinder and/or longitudinally-oriented grooves in the inner wall of the valve housing. Providing port openings through components of the actuator, the hydraulic link assemblies, and the valve housing may also form such fluid passages.

The actuator assembly is controllable to control the desired lift between 10 and 100 percent of maximum lift. That is, the control pulse directed to the actuator assembly can be modulated to provide full or partial lift, as desired. The control pulse is a modulated electric current directed to an electric coil that produces a magnetic field.

The present injection valve is particularly suited for injecting a gaseous fuel because the ability to modulate the movement of the valve needle may be beneficially used to slow down the closing action of the valve needle to reduce impact upon closing. When a liquid fuel is injected, the closing impact is dampened by the displacement of the thin liquid fuel layer, which is considerably denser than gaseous fuels. When the fuel is a gaseous fuel, it can be injected into the combustion chamber at a pressure greater than about 2000 psi (about 13.8 MPa).

A magnetostrictive material that is suitable for use in the present injection valve comprises a material known as ETREMA Terfenol-D® magnetostrictive alloy that is available from Etrema Products Inc. ETREMA Terfenol-D® magnetostrictive alloy is a metal alloy composed of the elements terbium, dysprosium, and iron.

In a preferred embodiment, the valve needle, actuated by a magnetostrictive assembly is controllable to move between the closed and open positions in less than about 250 microseconds.

To improve the range of valve lift for an actuator comprising a magnetostrictive member with a given length, a compressive force may be applied to the magnetostrictive member. The net displacement may be increased per respective unit of applied magnetic field by pre-loading the magnetostrictive member. Accordingly, a compression spring member may be employed for applying a compressive force to pre-load the magnetostrictive member. In a preferred embodiment, the compression spring member comprises at least one disc spring (also known as a Belleville spring or Belleville washer).

The injection valve housing may comprise a plurality of parts that are joined with each other to provide a fluidly sealed body. For example, the valve housing may comprise a hollow main housing with a removable valve cap that allows access to the valve components disposed within the main housing. The valve housing may further comprise a separate valve tip so that it is replaceable when worn. In addition, the valve tip may be designed so that it is the only portion of the valve body that is directly exposed to the interior of the combustion chamber. In this case the valve tip may be formed from a material that will provide greater durability when directly exposed to the conditions that might be expected within a combustion chamber.

While the hydraulic link is designed to compensate for changes in the dimensional relationships between valve components, including changes caused by differential thermal expansion, the demands placed upon the hydraulic link may be reduced by the selection of materials for the valve components that have similar thermal expansion coefficients.

A preferred fuel injection valve for an internal combustion engine comprises:
(a) a valve housing comprising:
   a fuel inlet port;
   an interior chamber fluidly connected to the fuel inlet port;
   a nozzle comprising a valve seat and a nozzle orifice providing a fluid passage from the interior chamber to the combustion chamber;
(b) a valve needle formed from a ferromagnetic material comprising a cylindrical portion having a sealing end and a piston portion having a pre-load end, the valve needle disposed within the valve housing wherein the valve needle is movable between a closed position at which the sealing end contacts the valve seat to fluidly seal the interior chamber from the nozzle orifice, and an open position at which the sealing end is spaced apart from the valve seat whereby the interior chamber is fluidly connected with the nozzle orifice, wherein valve lift equals distance traveled by the sealing end away from the valve seat;
(c) a needle spring associated with the pre-load end of the valve needle, wherein the needle spring is compressed to apply a closing force to the valve needle for biasing the valve needle in the closed position;
(d) an actuator assembly that may be activated to apply an opening force to the valve needle that is stronger than the closing force, for moving the valve needle to the open position, the actuator assembly comprising:
   a tubular magnetostrictive member disposed around the cylindrical portion of the valve needle;
   an electrical coil disposed around the magnetostrictive member;
   a flux tube disposed around the electrical coil; and
   a support for the actuator assembly that acts as a pole and provides a fixed position for one end of the magnetostrictive member relative to the valve housing; and
(e) a hydraulic link assembly comprising a sealed hydraulic cylinder disposed about the piston portion of the valve needle, a hydraulic fluid disposed within the hydraulic cylinder, wherein the opening and closing forces applied to the valve needle are transmitted through a thickness of the hydraulic fluid whereby the hydraulic fluid acts as a hydraulic link and the thickness is automatically adjustable in response to changes in the dimensional relationship between components of the injection valve to maintain a desired valve lift when the actuator assembly is activated.

These and other advantages are provided by a directly actuated injector as described below.

DETAILED DESCRIPTION OF PREFERRED EMBODIMENT(S)

Figure 1:
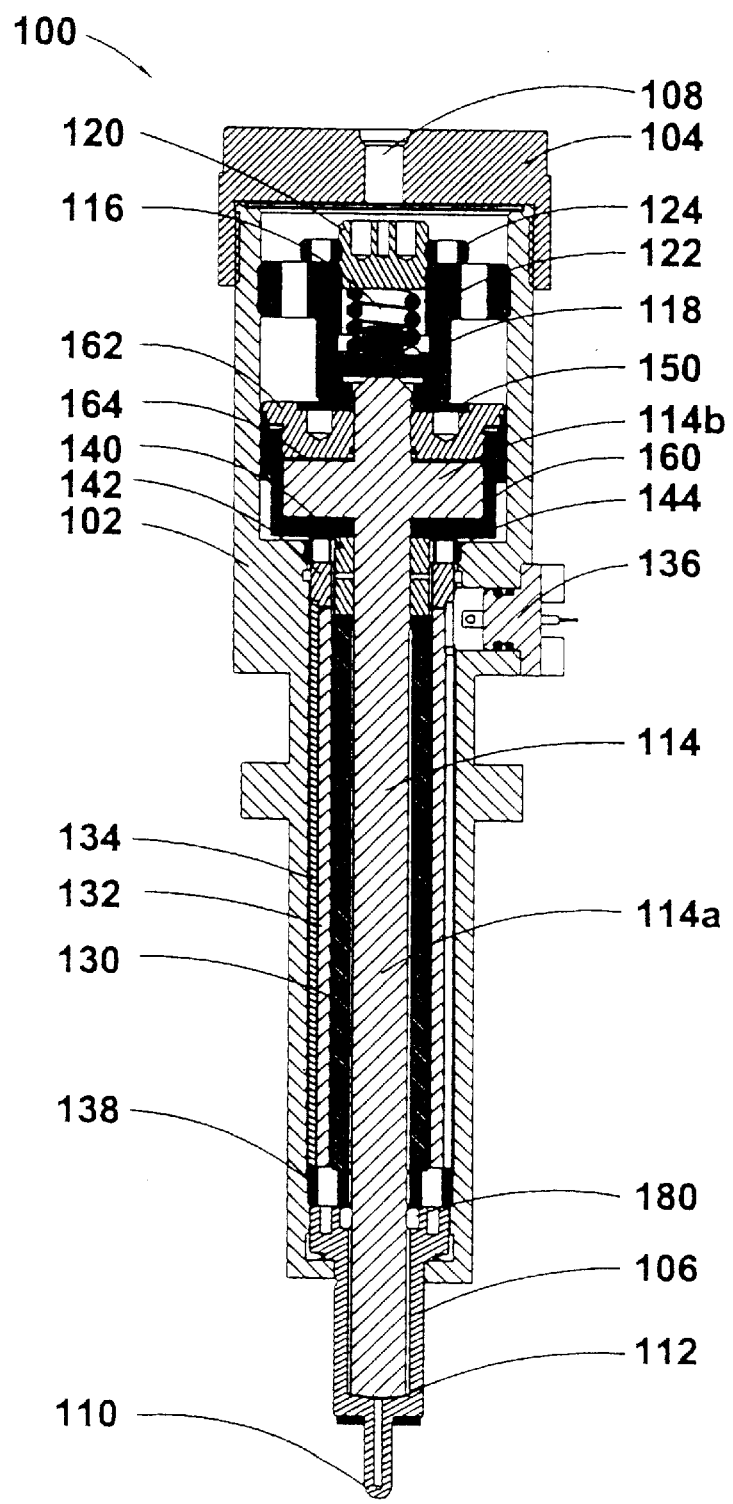
FIG. 1 is a cross-sectional view of a preferred embodiment of a directly actuated fuel injection valve.
Figure 2:
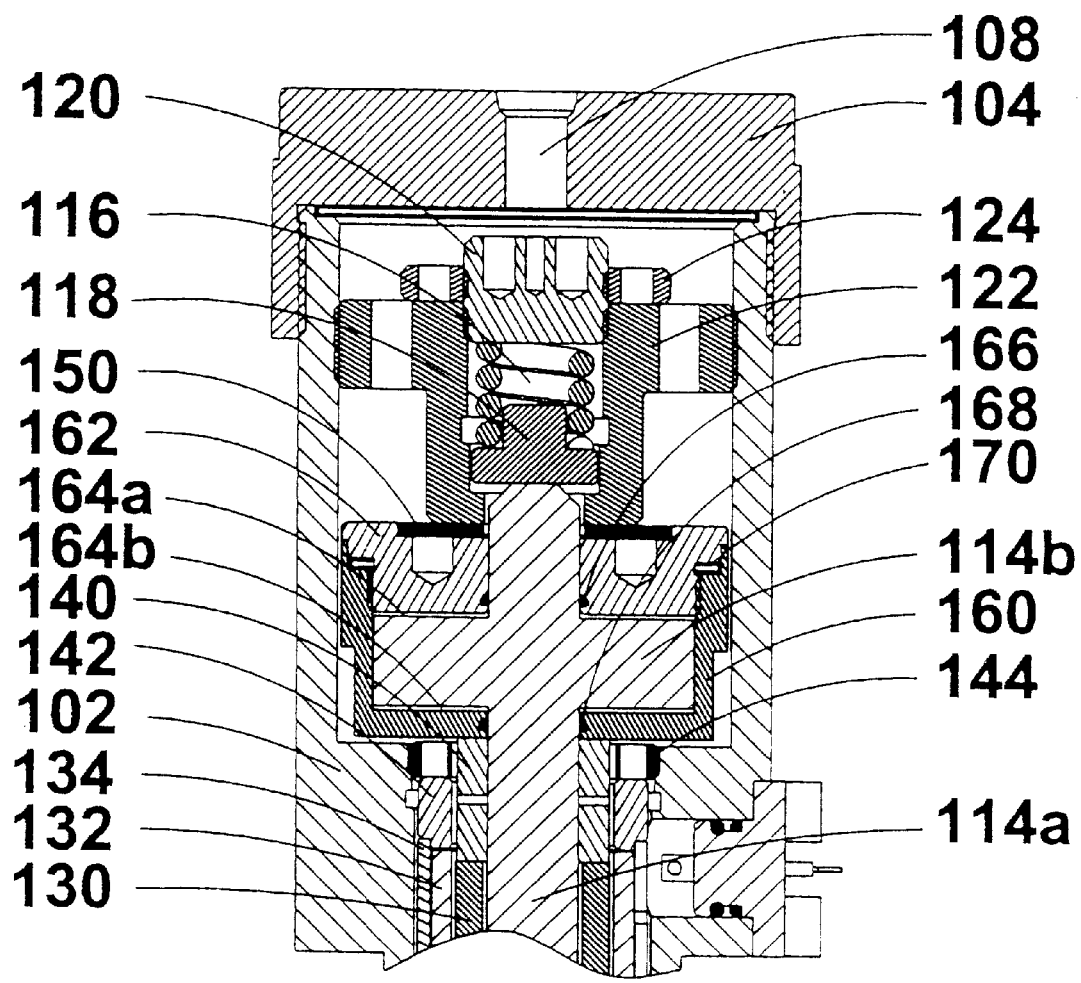
FIG. 2 is an enlarged view of an upper portion of the fuel injection valve of FIG. 1.
Figure 3:
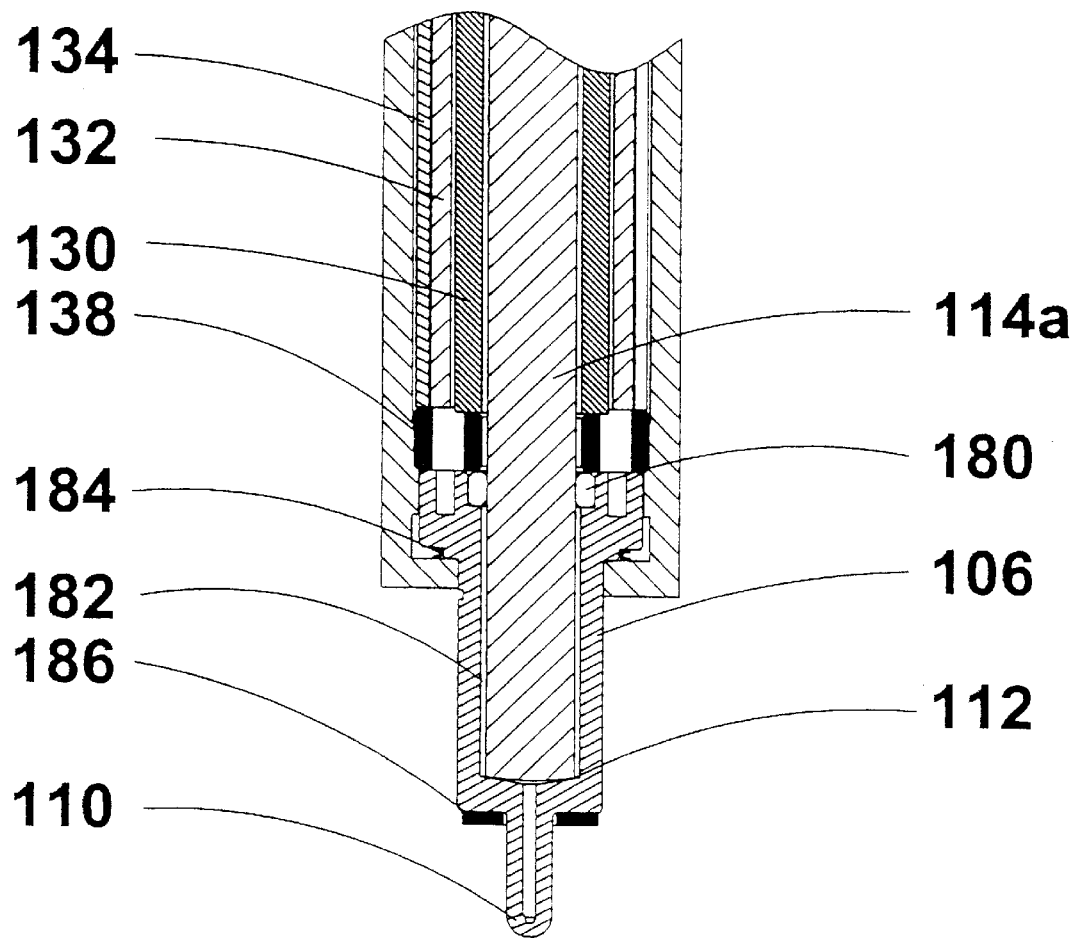
FIG. 3 is an enlarged view of a lower portion of the fuel injection valve of FIG. 1.

FIGS. 1 through 3 show a preferred embodiment of a directly actuated fuel injection valve 100 for internal combustion engines. Injection valve 100 includes elongated valve housing 102 that cooperates with valve cap 104 and valve tip 106 to provide a fluidly sealed valve body. Seals may be employed to ensure that the assembled valve body is fluid-tight. Valve cap 104 comprises inlet port 108 through which fuel enters the valve body, and valve tip 106 comprises at least one nozzle orifice 110 through which fuel exits the valve body. Valve tip 106 further comprises valve seat 112.

In the preferred embodiment, shown more clearly in the enlarged view of FIG. 3, valve seat 112 is angled to maximize fluid flow following the sealing area (where valve needle 114 contacts valve seat 112). The differential angle between the end surface of valve needle 14 and valve seat 112 is chosen so that the flow area does not decrease as gas moves inward toward the central throat of valve tip 106 that feeds nozzle orifice(s) 100.

Valve Needle

Valve needle 114 is disposed within the interior of the valve body and contacts valve seat 112 to close injection valve 100 by preventing fuel from passing beyond valve seat 112 to nozzle orifice 110. In the embodiment of FIG. 1, valve needle 114 comprises valve stem 114a, which moves into the open position by moving inward within the valve body to lift away from valve seat 112. Valve stem 114a is a cylindrical member and since the valve lift is generally small (for example, about 65 micrometers), the diameter of valve stem 114a is selected to ensure sufficient flow capacity through the valve opening since flow area (A) is proportional to valve stem diameter (that is, A=Π×diameter×lift). Hence, a small lift can be compensated for by a larger diameter. In the preferred embodiment illustrated by FIG. 1 valve needle 114 further comprises a separate piston member may cooperate with valve needle 114 to provide the same effect. While valve needle 114 is shown as a one-piece body comprising valve stem 114a and piston 114b, a multi-piece needle assembly may be substituted, for example, to facilitate fabrication of the needle. However, according to the preferred embodiment, all parts of valve needle 114 are advantageously formed from a ferromagnetic material such as a tool steel, such as, for example, H type or M type tool steel. A ferromagnetic material is selected that has desirable through hardness properties for durability and wear resistance for the needle tip and piston 114b. The ferromagnetic material also preferably is an easily machined material that has lower material and manufacturing costs than suitable non-ferromagnetic materials with equivalent hardness and durability characteristics.

Spring Assembly

A spring assembly biases valve needle 114 in the closed position. In a preferred arrangement, the spring assembly comprises at least one needle spring 116 for providing a closing force to valve needle 114. With reference to embodiment of FIG. 1, the spring assembly further comprises a needle spring guide 118 for transmitting the closing force from needle spring 116 to valve needle 114. Needle spring 116 is held in compression by needle spring adjuster 120, which cooperates with needle spring housing 122 to provide a load path to valve housing 102. In a preferred arrangement, respective threaded surfaces join needle spring adjuster 120 to needle spring housing 122, and needle housing 122 to valve housing 102. After needle spring adjuster 120 has been rotated to compress needle spring 116 to provide the desired pre-load force to needle spring 116, locking nut 124 may be tightened to prevent needle spring adjuster 120 from loosening. The spring energy set by compressing or pre-loading needle spring 116 provides the closing force for keeping valve needle 114 in the closed position.

Actuator Assembly

An actuator assembly may be activated to provide an opening force that is opposite and greater than the closing force provided by the spring assembly. In the embodiment illustrated in FIG. 1, the actuator assembly comprises a magnetostrictive member that expands or contracts in the direction of the opening force when the member is exposed to a magnetic field.

In the embodiment illustrated by FIG. 1, the actuator assembly is a magnetostrictive actuator that comprises magnetostrictive member 130, electric coil 132 disposed around the outer diameter of magnetostrictive member 130, a flux tube 134 disposed around electric coil 132. Flux tube 134 may be formed from any magnetically permeable material such as ferrite, stainless steel, or common carbon steel. A lengthwise slit may be provided opposite to where the magnetostrictive member is positioned in the assembled actuator assembly to break eddy currents. In another embodiment (not shown) the valve housing acts as the flux tube. That is, the flux tube is integral with valve housing 102, which may be formed from stainless steel or common carbon steel.

An electric current is supplied to electrical fitting 136. Electric leads (not shown) conduct the electric current from electrical fitting 136 to electric coil 132. When an electric current is applied to electric coil 132 a magnetic flux develops that flows through magnetostrictive member 130, pole 138, 140 and 142, and flux tube 134. Poles 138, 140 and 142 are formed from a suitable magnetically permeable material such as ferrite, stainless steel or common carbon steel. Pole 138 is a "fixed" pole that provides a structural support for a first end of magnetostrictive member 130, electric coil 132 and flux tube 134. Pole 140 is associated with a second end of magnetostrictive member 130 and pole 142 is associated with a second end of electric coil 132 and flux tube 134. Pole 140 is an "inner" pole and pole 142 is an "outer" pole disposed concentrically around inner pole 140. Pole 142, electric coil 132 and flux tube 134 are held in place by lock nut 144, which preferably threads into the inner wall of valve housing 102. Poles 140 and 142 cooperate with one another to provide a flux path at the second end of the actuator assembly, but pole 140 may move relative to pole 142 so that magnetostrictive member 130 may expand in the direction of the magnetic field which is oriented so that the actuator assembly provides an opening force in opposition to the closing force of the spring assembly.

In another embodiment (not shown), poles 138 and 142 are integral parts of valve housing 102 and pole 140 may be integral with magnetostrictive member 130. Poles 138 and 142 can be integrated with housing 102 when housing 102 is formed from a material which is magnetically permeable, such as stainless steel or common carbon steel.

A pre-compression force is preferably applied to magnetostrictive member 130 to amplify the magnitude of expansion when a magnetic field is applied. Pre-compression of magnetostrictive member 130 increases the net displacement per unit of applied magnetic field. A spring, such as, for example, disc spring 150 may be employed to provide the pre-compression force. Alternative compression elements may be employed in place of disc spring 150 to provide the pre-compression force, such as, for example, a coil spring or another type of spring with the same spring force, a hydraulic piston, or a combination of compression elements. When a pre-compression force is employed, the actuator's displacement can increase to about 0.13% of the total length of magnetostrictive member 130. However, the amount of displacement may decline as a function of increasing temperature. For example, at typical reciprocating engine cylinder head temperatures the actual displacement may be about 0.065% of the length of pre-compressed magnetostrictive member 130.

The dimensions of magnetostrictive member are dictated by the requirements of injection valve 100. For example, if injection valve 100 is designed to provide a lift of at least about 65 µm, magnetostrictive member 130 is sized to have a length of at least about 100 mm. Additionally, the wall thickness of annular magnetostrictive member 130 is selected to provide sufficient force to overcome all of the opposing forces that hold injection valve 100 in the closed position. If the cross-sectional area of annular magnetostrictive member 130 is not sufficient, the opposing forces can reduce or prevent longitudinal displacement of magnetostrictive member 130, even when electric coil 132 is fully energized. This mode is known as the "blocked force" mode. Accordingly, the magnitude of the closing forces acting on valve needle 114 dictate the cross sectional area of magnetostrictive member 130.

As shown in FIG. 1, the actuator assembly is preferably located within valve housing 102 and disposed concentrically around valve stem 114a where it occupies a portion of the annular space between valve stem 114a and valve housing 102. Accordingly, the actuator assembly may be exposed to fuel that is directed through the hollow valve body on its way from inlet port 108 to nozzle orifice 110.

Hydraulic Link Assembly

The opening force generated by the actuator assembly is transmitted to valve needle 114 through a hydraulic link assembly. The hydraulic link assembly comprises hydraulic cylinder 160, which is disposed in close-fitting relationship around hydraulic piston 114b, which is free to move in the longitudinal direction within cylinder 160. As mentioned above, in the embodiment of FIG. 1, hydraulic piston 114b is an integral part of valve needle 114 and the side wall of cylinder 160 helps to guide the movement of valve needle 114 in the actuating direction. A viscous hydraulic fluid is sealed inside hydraulic cylinder 160 by cylinder cap 162 and seals 166, 168 and 169 (see FIG. 2). Seals 166 and 168 permit valve needle 114 to move relative to cylinder cap 162 and cylinder 160, respectively. Known seals may be employed, such as, for example elastomeric O-ring seals, packing, metal seals, or diaphragm/bellow seals.

The diametrical clearance gap between the outside diameter of hydraulic piston 114b and the inside diameter of hydraulic cylinder 160 is extremely small (on the order of 20 to 250 microns). The desired size of the clearance gap is dependent on several factors such as the viscosity of the chosen hydraulic fluid, the axial length of the piston, and the thickness of the hydraulic fluid above and below the piston. The hydraulic flow in the clearance gap is governed by the Hagen-Poiseuille Flow and the hydraulic fluid and clearance gap are preferably selected so that the flow of hydraulic fluid through the gap is insignificant during the time span of fuel injection events when an opening force is transmitted through the hydraulic fluid. Furthermore, the hydraulic fluid preferably has a sufficiently high viscosity and bulk modulus so that it acts as an incompressible solid when activation of the actuator assembly causes a valve opening force to be quickly transmitted through the hydraulic fluid between the bottom of cylinder 160 and hydraulic piston 114b. For consistency of operation, the hydraulic fluid is also preferably an extremely stable fluid that maintains its desired properties over a wide range of temperatures (that is, within the expected operating temperatures inside cylinder 160). Suitable hydraulic fluids are, for example, conventional motor oil, such as grade 15W40, or synthetic lubricants such as DuPont® Krytox® grease, which is available in a range of viscosities. Krytox® is a perfluoropolyether (PFPE) synthetic lubricant that may be mixed with a thickener to form a grease. These types of hydraulic fluids also help to lubricate seals 166 and 168. Different injection valves may have different sized pistons and clearance gaps, so the hydraulic fluid may be selected with consideration to the characteristics of an individual injection valve design.

When injection valve 100 is closed and at rest, the closing force is transmitted through the hydraulic fluid held between cylinder cap 162 and hydraulic piston 114b. Typically, during engine operation, injection valve 100 is closed most of the time (normally over 90% of the time). Accordingly, there is enough time between injection events for the hydraulic fluid to redistribute itself by flowing through the clearance gap so that hydraulic cylinder 160 moves relative to piston 114b to automatically "re-zero" itself. The initial zero-position is the position of hydraulic piston 114b within hydraulic cylinder 160 after assembly of injection valve 100. The initial zero position may not be the same for all injectors due to variation in the length of components within manufacturing tolerances. Also, during operation, the zero-position auto-adjusts to change depending, for example, upon component wear or upon the effects of thermal expansion on the dimensional relationship between components.

Differential thermal expansion or contraction may be caused by differences in thermal expansion coefficients or uneven heat distribution between the components. Even though the components of injection valve 100, such as magnetostrictive member 130, valve needle 114, and valve housing 102, are designed to be reasonably matched to the thermal expansion rates of the other components, because the valve lift and the displacement of the components that causes the lift are so small, the effects of thermal expansion or contraction should be taken into account to ensure the desired valve lift is achieved. The effects of thermal expansion and contraction may be amplified if the injection valve is exposed to a wide range of temperatures. For injection valves used in vehicles it would not be uncommon to expect a temperature range between −40° C. (in cold climates) and +125° C. (when the engine is running). An uneven temperature distribution may be the result of many factors, including, for example, the influence of (1) heat generated at coils 132; (2) magnetic hysteresis in the actuator assembly; and (3) heat transfer from the cylinder head or the combustion chamber via valve tip 106. If unaccounted for, the total effect of differential thermal expansion or contraction on the displacement of valve needle 114 may be greater than the targeted lift.

In summary, the hydraulic link assembly accounts for variations in component dimensions arising from the permitted tolerances in the manufacturing processes and the injection valve assembly methods. Therefore, the hydraulic link assembly reduces manufacturing costs by allowing the injection valve components to be manufactured to less exacting tolerances. In addition, during operation, the hydraulic link assembly auto-adjusts itself between injection events to account for changes in the dimensional relationship between injection valve components that may be caused, for example, by component wear or differential thermal expansion or contraction.

Summary of Operation

When injection valve 100 is at rest in the closed position, the closing force that biases valve needle 114 against valve seat 112 originates from needle spring 116. From needle spring 116, the closing force is transmitted through needle spring guide 118 to valve needle 114. It is preferable for the closing force to be provided by a mechanical spring member, such as the illustrated coil spring, so that the failure mode for injection valve 100 will be in the closed position. That is, if the actuating assembly is not energized or fails, injection valve 100 will remain in the closed position.

To initiate an injection event the actuator assembly is energized by directing an electric current to electric coil 132. A magnetic flux develops that flows through magnetostrictive member 130, poles 138, 140, and 142, and flux tube 134. Under the influence of the magnetic field, magnetostrictive member 130 expands in length (in the direction of the magnetic field). Since pole 138 is in a fixed position, magnetostrictive member 130 expands in the direction of hydraulic cylinder 160. An opening force, originating from expanding magnetostrictive member 130 is transmitted through inner pole 140, the base of cylinder 160, hydraulic fluid 164b (see FIG. 2), which is held between the base of cylinder 160 and a planar surface of hydraulic piston 114b, and finally, through piston 114b, which in the illustrated embodiment is integral with valve needle 114. The opening force is greater than the closing force, which results in compression of needle spring 116. The displacement of hydraulic cylinder 160 also causes further compression of disc spring 150.

As previously discussed, because valve actuation occurs suddenly (on the order of 200 μs), hydraulic fluid 164b does not have time to flow through the narrow clearance gap between piston 114*b* and hydraulic cylinder 160. Instead, hydraulic fluid 164*b* acts as a solid and transfers the movement of magnetostrictive member 130 to valve needle 114 via piston 114*b*, causing valve needle 114 to lift away from valve seat 112. Because injection valve 100 stays open for such a brief period (typically less than 3 milliseconds), as long as the viscosity of hydraulic fluid 164 is properly selected and the clearance gap is suitably sized, the flow of hydraulic fluid 164 through the clearance gap while injection valve 100 is open is insignificant so that any displacement caused by such flow is much less than the total displacement of valve needle 114.

The movement of valve needle 114 is guided near valve tip 106 by guide 180 (see FIG. 3). FIG. 3 shows annular space 182 disposed around valve stem 114*a*. Between injection events, fuel remains in annular space 182. When injection valve 100 is open, fuel flows through annular space 182, other gaps between valve components, and openings provided in certain valve components, which all cooperate to permit the free flow of fuel from inlet port 108 through to nozzle orifice 110 (which may be one of a plurality of nozzle orifices radially oriented from the nozzle throat). For example, FIGS. 1 through 3 show openings that provide fluid passages through components such as needle spring housing 122, lock nut 144, and pole 138. FIG. 3 also shows seal 184 between valve housing 102 and valve tip 106, and cylinder head face seal 186, which seals between injection valve 100 and the engine cylinder head (not shown).

As fuel flows through valve housing 102, the fuel cools the actuator assembly. The fuel flow path is preferably arranged to provide the greatest cooling to the internal diameter surface of electric coil 132 and the outer diameter surface of magnetostrictive member 130. In addition, a small percentage of the fuel flow, perhaps up to about 20%, may be directed to flow between the internal diameter of magnetostrictive member 130 and the surface of cylindrical valve stem 114*a*. When the fuel is used to cool the actuator assembly in this manner, thermal modeling predicts a temperature rise of less than 10° C.

To close injection valve 100, at the end of the injection event, electric coil 132 is de-energized, causing magnetostrictive member 130 to contract. When valve needle 114 is moving from the open position to the closed position, the closing force originates from needle spring 116 and disc spring 150. The closing force from needle spring 116 is again transmitted to valve needle 114 through needle spring guide 118. In the open position, the expanded magnetostrictive member 130 compressed disc spring 150, so upon closing, disc spring 150 de-compresses to push cylinder 160 down and to compress to magnetostrictive member 130. Disc spring 150 may also provide an additional closing force to valve needle 114 by generating a closing force that is transmitted from disc spring 150 through cylinder cap 162, hydraulic fluid 164*a* and hydraulic piston 114*b*.

When valve needle 114 moves from the open position to the closed position, the time that elapses is again typically less than 250 microseconds, and preferably less than about 200 microseconds so hydraulic fluid 164 again does not have time to flow through the clearance gap between piston 114*b* and cylinder 160. Consequently, pressure builds up in hydraulic fluid 164*a* on the upper planar surface of piston 114*b*.

Once valve needle 114 contacts valve seat 112, injection valve 100 is closed. When injection valve 100 is closed, the hydraulic link assembly automatically self-adjustments so that the position of hydraulic cylinder 160 relative to hydraulic piston 114*b* is corrected to account for the effects of temperature, wear, and any small movements of valve needle 114 relative to hydraulic cylinder 160 that may have occurred while valve needle 114 was in the open position. Auto-adjustments are accomplished by the migration of hydraulic fluid 164 from one side of hydraulic piston 114*b* to the other, while disc spring 150 ensures that hydraulic cylinder 160 and valve needle 114 remain in direct contact at all times.

Figure 4:
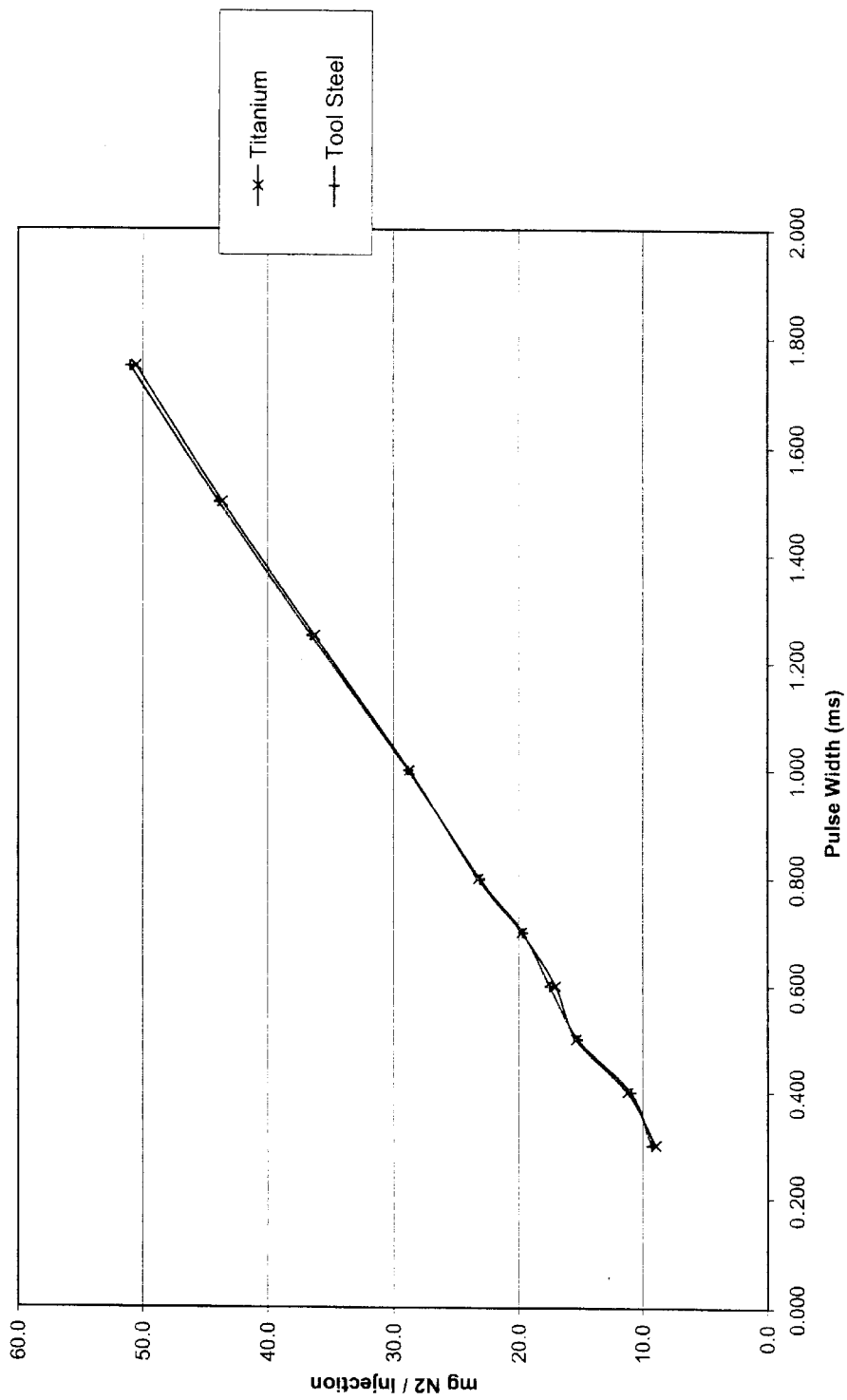
FIG. 4 is a graph that compares the performance of an injection valve equipped with a ferromagnetic needle to the performance of the same valve equipped with a non-ferromagnetic needle.

FIG. 4 is a graph that plots the performance of the same injection valve but with different needles. In one test, the injection valve was equipped with a non-ferromagnetic needle and a second test the same injection valve was equipped with a ferromagnetic needle. In this experiment, the non-ferromagnetic needle was formed from titanium and the ferromagnetic needle was formed from tool steel.

The injection valve was tested using nitrogen instead of fuel. For the purposes of demonstrating valve performance, nitrogen behaves essentially the same as gaseous fuels such as natural gas. The graph plots the mass flow of nitrogen against pulse width (that is, the time the injection valve is held open for an injection event). As one would expect, higher mass flows were recorded for longer pulse widths.

The performance of the injection valve equipped with the titanium needle is plotted with the points marked by an "x". The performance of the injection valve equipped with the tool steel needle is plotted with the points marked by a "+" The two plotted performance curves are substantially the same. Accordingly, the graph in FIG. 4 shows that a ferromagnetic needle can be substituted for a non-ferromagnetic needle without influencing performance and without draining flux from the magnetostrictive member.

The present injection valve provides several benefits, including:

a compact concentric valve needle/actuator assembly arrangement for accommodating an elongated tubular magnetostrictive member.

improved durability by employing a valve needle formed from a ferromagnetic material instead of a non-ferromagnetic material. Known devices which employed members disposed within a tubular magnetostrictive member have used members formed from non-ferromagnetic materials to avoid leakage of magnetic flux. However, non-ferromagnetic materials such as austenitic stainless steels, titanium, and ceramics cannot match the throughhardness properties and durability of ferromagnetic materials.

improved manufacturability and machinability of the valve needle to higher tolerances for less variability in manufactured component dimensions. Manufacturability to high tolerances is an important advantage because the displacement of the valve needle caused by the expansion of the magnetostrictive member is relatively small so less variability in manufactured component dimensions improves performance and consistency of operation.

suitable ferromagnetic materials are typically less expensive than suitable non-ferromagnetic materials.

improved manufacturability is made possible by the use of axisymmetric cylindrical parts and few tight tolerances between the injection valve components.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. An injection valve for injecting fuel into a combustion chamber of an internal combustion engine, said injection valve comprising:
    (a) a valve housing comprising:
        a fuel inlet port;
        an interior chamber fluidly connected to said fuel inlet port;
        a nozzle comprising at least one nozzle orifice providing a fluid passage from said interior chamber to said combustion chamber;
    (b) a valve needle formed from a ferromagnetic material and disposed within said valve housing wherein said valve needle is movable between a closed position at which a sealing end of said valve needle contacts a valve seat to fluidly seal said interior chamber from said nozzle orifice, and an open position at which said sealing end of said valve needle is spaced apart from said valve seat whereby said interior chamber is fluidly connected with said nozzle orifice;
    (c) a needle biasing mechanism associated with said valve needle, said needle biasing mechanism applying a closing force to said valve needle for biasing said valve needle in said closed position; and
    (d) an actuator assembly associated with said valve needle and disposed within said interior chamber in an annular space surrounding at least a portion of said valve needle, said actuator assembly comprising a magnetostrictive member actuatable to expand in length and apply an opening force to said valve needle stronger than said closing force, thereby moving said valve needle to said open position.

2. The injection valve of claim 1 wherein said needle biasing mechanism is a spring.

3. The injection valve of claim 2 wherein said spring comprises at least one disc spring.

4. The injection valve of claim 1 further comprising a hydraulic link assembly comprising a passive hydraulic link having a hydraulic fluid thickness through which said opening and closing forces are transmitted, whereby said hydraulic fluid acts substantially as a solid with said thickness being substantially constant while said actuator assembly is activated and wherein said thickness of said hydraulic link is adjustable while said actuator is not activated in response to changes in the dimensional relationship between components of said injection valve to maintain a desired valve lift upon activation of said actuator assembly.

5. The injection valve of claim 1 wherein said ferromagnetic material is tool steel.

6. The injection valve of claim 5 wherein said tool steel is selected from the group consisting of H type and M type tool steels.

7. The injection valve of claim 4 wherein said thickness of said hydraulic link is auto-adjustable in response to changes in said dimensional relationship caused by at least one of differential thermal expansion, variations in manufactured dimensions within prescribed tolerances, and component wear.

8. The injection valve of claim 1 wherein said piston is an integral part of said valve needle.

9. The injection valve of claim 1 wherein said actuator assembly comprises a magnetostrictive member, an electric coil disposed around said magnetostrictive member and a flux tube disposed around said electric coil.

10. The injection valve of claim 9 wherein one end of said tubular actuator assembly is supported by a pole that is attached to said valve housing.

11. The injection valve of claim 4 wherein fluid passages extend through or between said actuator and hydraulic link assemblies and said valve housing to allow said fuel to flow to said nozzle orifices and cool said actuator and hydraulic link assemblies.

12. The injection valve of claim 11 wherein said fluid passages are formed by grooves in the longitudinal surfaces of components of said actuator assembly and said hydraulic cylinder.

13. The injection valve of claim 11 wherein said fluid passages are formed by longitudinal grooves in the inner wall of said valve housing.

14. The injection valve of claim 11 wherein said fluid passages are formed by port openings through components of said actuator and hydraulic link assemblies and said valve housing.

15. The injection valve of claim 1 wherein valve lift is controllable by varying the magnitude of an electric current directed an electric coil to apply a magnetic field to said magnetostrictive actuator assembly.

16. The injection valve of claim 8 wherein said magnetostrictive member comprises a metal alloy comprising terbium, dysprosium and iron.

17. The injection valve of claim 1 wherein said fuel is a gaseous fuel.

18. The injection valve of claim 17 wherein said hydraulic fluid is a liquid.

19. The injection valve of claim 18 wherein said hydraulic fluid is selected from the group consisting of motor oil and grease.

20. The injection valve of claim 8 wherein said housing is formed from a magnetically permeable material and said flux tube is an integral part of said valve housing.

21. An injection valve for injecting fuel into a combustion chamber of an internal combustion engine, said injection valve comprising:
    (a) a valve housing comprising:
        a fuel inlet port;
        an interior chamber fluidly connected to said fuel inlet port;
        a nozzle comprising a valve seat and a nozzle orifice providing a fluid passage from said interior chamber to said combustion chamber;
    (b) a valve needle formed from a ferromagnetic material comprising a cylindrical portion having a sealing end and a piston portion having a pre-load end, said valve needle disposed within said valve housing wherein said valve needle is movable between a closed position at which said sealing end contacts said valve seat to fluidly seal said interior chamber from said nozzle orifice, and an open position at which said sealing end is spaced apart from said valve seat whereby said interior chamber is fluidly connected with said nozzle orifice, wherein valve lift equals distance traveled by said sealing end away from said valve seat;
    (c) a needle spring associated with said pre-load end of said valve needle, wherein said needle spring is compressed to apply a closing force to said valve needle for biasing said valve needle in said closed position;
    (d) an actuator assembly that may be activated to apply an opening force to said valve needle that is stronger than said closing force, for moving said valve needle to said open position, said actuator assembly comprising:
        a tubular magnetostrictive member disposed around said cylindrical portion of said valve needle;
        an electrical coil disposed around said magnetostrictive member;

a flux tube disposed around said electrical coil; and a support for said actuator assembly that acts as a pole and provides a fixed position for one end of said magnetostrictive member relative to said valve housing; and (e) a hydraulic link assembly comprising a sealed hydraulic cylinder disposed about said piston portion of said valve needle, a hydraulic fluid disposed within said hydraulic cylinder, wherein said opening and closing forces applied to said valve needle are transmitted through a thickness of said hydraulic fluid whereby said hydraulic fluid acts as a hydraulic link and said thickness is automatically adjustable in response to changes in the dimensional relationship between components of said injection valve to maintain a desired valve lift when said actuator assembly is activated.

22. The injection valve of claim 21 wherein said magnetostrictive member comprises a metal alloy comprising terbium, dysprosium and iron.

* * * * *